(12) United States Patent
Adilipour et al.

(10) Patent No.: US 11,281,761 B2
(45) Date of Patent: Mar. 22, 2022

(54) METHOD AND SYSTEM FOR USING A PLURALITY OF ACCOUNTS IN AN INSTANT MESSAGING APPLICATION

(71) Applicant: Magnificus Software Inc., Vancouver (CA)

(72) Inventors: Sahand Adilipour, Vancouver (CA); Seyed Parsa Mousavi Ghanavati, Port Coquitlam (CA)

(73) Assignee: MAGNIFICUS SOFTWARE INC., Vancouver (CA)

( * ) Notice: Subject to any disclaimer, the term of this patent is extended or adjusted under 35 U.S.C. 154(b) by 379 days.

(21) Appl. No.: 15/987,726

(22) Filed: May 23, 2018

(65) Prior Publication Data

US 2018/0343563 A1 Nov. 29, 2018

Related U.S. Application Data (60) Provisional application No. 62/510,440, filed on May 24, 2017.

(51) Int. Cl.
*G06F 21/00* (2013.01)
*H04L 29/06* (2006.01)
(Continued)

(52) U.S. Cl.
CPC .............. *G06F 21/41* (2013.01); *G06F 21/45* (2013.01); *H04L 51/04* (2013.01); *H04L 63/08* (2013.01);
(Continued)

(58) Field of Classification Search
CPC .............. H04W 12/06; H04W 12/0605; H04W 12/0608; G06F 21/41; G06F 21/45;
(Continued)

(56) References Cited

U.S. PATENT DOCUMENTS 10,142,391 B1 * 11/2018 Brisebois ................ H04L 65/80
2003/0212805 A1 * 11/2003 Motosaka ........... G06F 11/3409
709/228

(Continued)

FOREIGN PATENT DOCUMENTS

WO   WO-2010039460 A2 *   4/2010   ............. G06F 21/41

OTHER PUBLICATIONS

Günter Fahrnberger; "SIMS: A Comprehensive Approach for a Secure Instant Messaging Sifter"; 2014 IEEE 13th International Conference on Trust, Security and Privacy in Computing and Communications; Year: 2014 | Conference Paper | Publisher: IEEE; pp. 164-173 (Year: 2014).*

*Primary Examiner* — Kendall Dolly
*Assistant Examiner* — Courtney D Fields
(74) *Attorney, Agent, or Firm* — Pearl Cohen Zedek Latzer Baratz LLP (57) ABSTRACT

A computer-implemented method enables a user to use a plurality of instant messaging accounts in an instant messaging application, by: in response to a successful authentication, accessing a master account for an instant messaging application; in response to performing a given interaction, generating at least one additional instant messaging account, the generating comprising providing corresponding credentials for each given instant messaging account; in use, accessing the master account for the instant messaging application upon successful authentication and providing an access to any of the plurality of instant messaging accounts.

11 Claims, 7 Drawing Sheets

(51) Int. Cl.
*H04W 12/06* (2021.01)
*G06F 21/41* (2013.01)
*H04L 67/306* (2022.01)
*H04L 51/04* (2022.01)
*G06F 21/45* (2013.01)
*H04W 12/065* (2021.01)
*H04L 9/32* (2006.01)

(52) U.S. Cl.
CPC .......... *H04L 63/083* (2013.01); *H04L 67/306* (2013.01); *H04W 12/065* (2021.01); *H04W 12/068* (2021.01)

(58) Field of Classification Search
CPC ..... H04L 63/083; H04L 51/04; H04L 67/306; H04L 63/08
See application file for complete search history.

(56) References Cited

U.S. PATENT DOCUMENTS

2008/0261569 A1\* 10/2008 Britt .................. H04L 51/38
455/414.1
2011/0165860 A1\* 7/2011 Cai .................... H04L 63/1475
455/411

\* cited by examiner

METHOD AND SYSTEM FOR USING A PLURALITY OF ACCOUNTS IN AN INSTANT MESSAGING APPLICATION

CROSS-REFERENCE TO RELATED APPLICATIONS

This application claims the benefit of U.S. Provisional Patent Application No. 62/510,440, filed on May 24, 2017, entitled "Alias Accounts in Instant Messaging Application", the entire contents of which are incorporated by reference.

TECHNICAL FIELD OF THE INVENTION

The invention relates to the field of instant messaging and more particularly to a method and a system for using a plurality of instant messaging accounts in an instant messaging application.

BACKGROUND OF THE INVENTION

The widespread adoption of computers, smartphones and mobile devices by consumers has, among other things, resulted in a rapid growth in electronic communications. Increasingly, such electronic communications are being carried out, at least in part, via smartphones and other mobile devices. A variety of electronic messaging applications are well-known and widely used, including those that are based upon email, instant messaging (IM), and short message service (SMS) text.

The modern world lacks anonymity. GPS-enabled devices, tracking codes, cookies, tracking permissions granted to employers, providers and corporations and wearable technology gadgets ensure that servers collect an enormous quantity of personal data on users of electronic equipment.

Typically, the phone number, the email address and the profile name provided by a user in social networks and messenger applications cannot easily by changed. A user can obtain a new phone number, register for a new email address or create a new account in an application but this is a slow and sometimes cumbersome process and it cannot typically be repeated frequently.

A user may desire to have separate accounts available at the same time. Each account may have its own purpose. For instance, a specific account may be used for business purpose while another account may be used for personal purpose.

There is a need for a method and for a system that will overcome at least one of the above-identified drawbacks.

SUMMARY OF THE INVENTION

According to a broad aspect, there is disclosed a computer-implemented method for enabling a user to use a plurality of instant messaging accounts in an instant messaging application, the computer-implemented method comprising in response to a successful authentication, accessing a master account for an instant messaging application; in response to performing a given interaction, generating at least one additional instant messaging account, the generating comprising providing corresponding credentials for each given instant messaging account; in use, accessing the master account for the instant messaging application upon successful authentication and providing an access to any of the plurality of instant messaging accounts.

According to an embodiment, the successful authentication comprises providing a login, providing a password and determining that the login and the password provided are legitimate.

According to an embodiment, the providing of the credentials for each given instant messaging account comprises obtaining a password for each given instant messaging account and generating a login for each given instant messaging account.

According to an embodiment, the generating of the login comprises generating a fake phone number.

According to an embodiment, the generating of the login comprises selecting a given number of numbers of the generated fake phone number.

According to an embodiment, the generating of the at least one additional instant messaging account further comprises obtaining at least an alias name for each additional instant messaging account.

According to an embodiment, the generating of the at least one additional instant messaging account further comprises obtaining an alias picture for each additional instant messaging account.

According to an embodiment, the generating of the at least one additional instant messaging account comprises storing the corresponding generated credentials for each given instant messaging account.

According to an embodiment, the providing of an access to any of the plurality of instant messaging accounts comprises displaying a graphics user interface listing the plurality of instant messaging accounts.

According to an embodiment, the providing of an access to any of the plurality of instant messaging accounts comprises selecting a given instant messaging account of the plurality of instant messaging accounts.

According to an embodiment, the providing of the credentials for each given instant messaging account comprising obtaining corresponding credentials from an already existing corresponding instant messaging account.

According to a broad aspect, there is disclosed a computer-implemented method for enabling a user to use a plurality of instant messaging accounts in an instant messaging application, the computer-implemented method comprising accessing the master account of the instant messaging application upon successful authentication, the accessing of the master account comprising displaying of list of at least one previously generated additional instant messaging account and the master account; and providing an access to any of the plurality of instant messaging accounts; wherein the generating of the at least one additional instant messaging account comprises providing corresponding credentials for each given instant messaging account.

According to a broad aspect, there is disclosed a non-transitory computer-readable storage medium for storing computer-executable instructions which, when executed, cause a mobile device to perform a method for enabling a user to use a plurality of instant messaging accounts in an instant messaging application, the method comprising accessing the master account of the instant messaging application upon successful authentication, the accessing of the master account comprising displaying of list of at least one previously generated additional instant messaging account and the master account; and providing an access to any of the plurality of instant messaging accounts; wherein the generating of the at least one additional instant messaging account comprises providing corresponding credentials for each given instant messaging account.

An advantage of the method disclosed herein is that it enables a user to use a plurality of instant messaging accounts while logged in in a single instant messaging application.

Another advantage of the method disclosed herein is that it enables a user to create at least one additional instant messaging account without the need of having at least one additional dedicated mobile phone associated therewith.

Another advantage of the method disclosed herein is that each instant messaging account is handled independently from one another at the server. It is therefore impossible for a third party to distinguish between an alias account and a master account which is of great advantage.

Another advantage of the method disclosed herein is that the creation of an additional instant messaging account can be performed in a limited number of steps which is of great advantage for the user. As a matter of fact, the user does not even have to provide an existing phone number for the additional instant messaging account which is of great advantage.

Another advantage of the method disclosed herein is that the creation of an additional instant messaging account is performed when the user is logged using the master account which also reduces the complexity of the creation of the additional instant messaging account and the steps required for its creation.

Another advantage of the method disclosed herein is that the user may easily select an active instant messaging account in a given graphics user interface displayed in the instant message application which lists all available instant messaging accounts avoiding a logout and a subsequent login.

BRIEF DESCRIPTION OF THE DRAWINGS

In order that the invention may be readily understood, embodiments of the invention are illustrated by way of example in the accompanying drawings.

DETAILED DESCRIPTION OF THE INVENTION

The embodiments described herein are not, and are not intended to be, limiting in any sense. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present invention is generally illustrated herein in the form of an app, which is run on a mobile device. As used herein, mobile device can mean a smartphone, mobile phone, tablet, laptop computer or such other internet or communication network-enabled electronic device. An app of the sort described may be one that is developed for and run on one of a number of applicable operating systems; for example, in the case of smartphones, the app may be developed for use with an Android™-based, an iOS™-based, a Windows Phone/Mobile-based or a BlackBerry OS-based operating system, or such other operating system for mobile devices. For simplicity of reference, the action of a user in selecting icons, options or parts of the screen of the mobile devise is generally described as "clicking on" or "clicks", although it should be understood that this can include keyboard touches, "swipes", other user gestures or voice commands which generally operate to provide user input to the mobile device.

The present invention may also be discussed in the general context of computer code or machine-usable instructions, including computer-executable instructions such as program modules, being executed by a computer or other machine, such as a personal data assistant or other handheld mobile device. Generally, program modules including routines, programs, objects, components, data structures, etc., refer to code that perform particular tasks or implement particular abstract data types. The invention may be practiced in a variety of system configurations, including handheld mobile devices, consumer electronics, general-purpose computers, etc.

Figure 1:
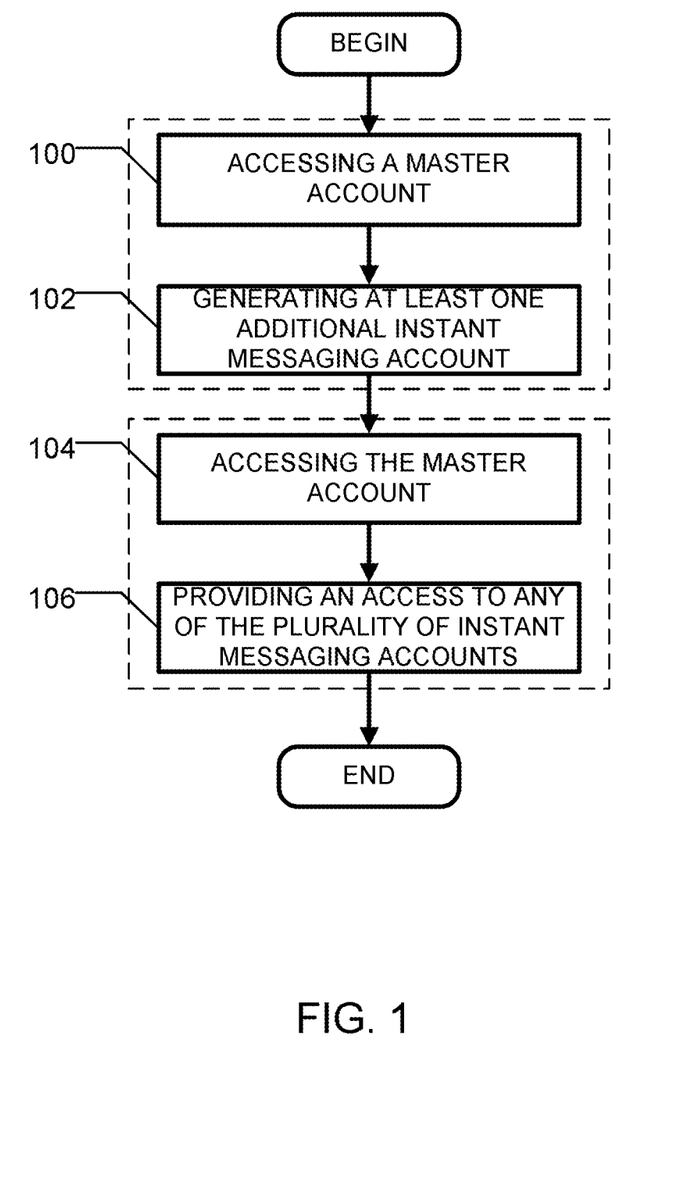
FIG. 1 is a flowchart which shows an embodiment of a method for enabling a user to use a plurality of instant messaging accounts. According to a first processing step, a master account is accessed. According to a second processing step, at least one additional instant messaging accounts is generated.

Now referring to FIG. 1, there is shown an embodiment of a computer-implemented method for enabling a user to use a plurality of instant messaging accounts. As mentioned, it will be appreciated that an additional instant messaging account created might be referred to as an alias account in the foregoing. As shown herein, it will be appreciated that the user may have multiple alias accounts. It will be appreciated that in one embodiment, a limit as to the number of alias account permitted per user account, i.e. per master account, may be determined and imposed by the administrators of the instant messaging application. It will be further appreciated that the instant messaging accounts created may be used by the instant messaging application of the user or may alternatively be transferred to another user account. In one embodiment, the instant messaging application is Hoop Messenger™ manufactured by Magnificus Software Inc.

According to processing step 102, a master account is accessed. It will be appreciated that the master account can be referred to as the primary instant messaging account of the given user, i.e. the main instant messaging account or user account. In other words, the master account is the first instant messaging account created by the user in the instant messaging application. Moreover and in one embodiment, it will be appreciated that the master account is typically associated with a given mobile phone. It will be therefore appreciated that the master account is accessed by the user interacting with the mobile device on which the instant messaging application is running. The skilled addressee will appreciate that the master account may be accessed according to various embodiments.

Figure 2:
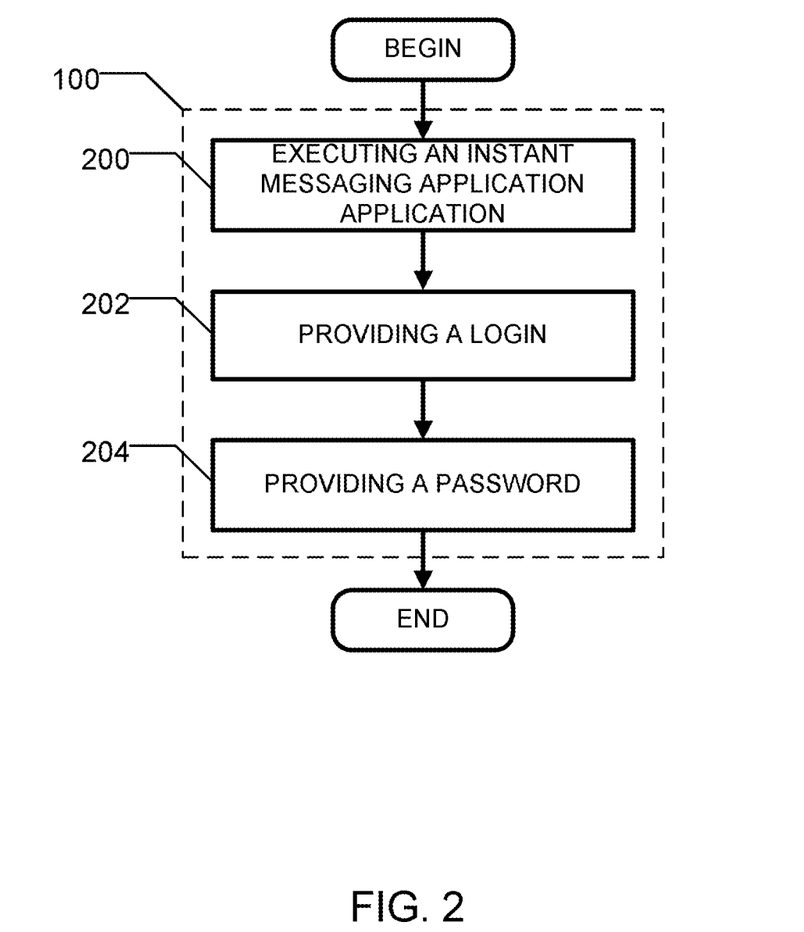
FIG. 2 is a flowchart which shows an embodiment for accessing the master account.

Now referring to FIG. 2, there is shown an embodiment for accessing the master account.

According to processing step 200, an instant messaging application is executed. It will be appreciated that the instant messaging application is executed on the mobile device of the user. In an alternative embodiment, the instant messaging application is executed on another type of processing unit of the user. The skilled addressee will appreciate that the instant messaging application may be executed according to various embodiments.

In one embodiment, the execution comprises a user interacting with an icon indicative of the instant messaging application which is displayed on a graphics user interface of the mobile device showing all available applications. In one embodiment, the instant messaging application accessed is Hoop Messenger™ manufactured by Magnificus Software Inc.

According to processing step 202, a login is provided. It will be appreciated that in one embodiment the login is provided by the user interacting with the mobile device. The login may be of various types, as known to the skilled addressee. In one embodiment, the login comprises a phone number associated with the master account of the user. In fact, it will be appreciated that the phone number is also associated with the mobile device of the user.

As further explained below, it will be appreciated that each instant messaging account can be accessed, inter alia, using a corresponding dedicated phone number and a corresponding password.

According to processing step 204, a password is provided. It will be appreciated that the password may be provided according of various embodiments. In one embodiment, the password is provided by the user interacting with the mobile device. It will also be appreciated that the password may be of various types as known to the skilled addressee. In one embodiment, the password is defined by a preselected chain of characters. The skilled addressee will appreciate that various alternative embodiments may be possible for the password.

Now referring back to FIG. 1 and according to processing step 102, at least one instant messaging account is generated. It will be appreciated that the at least one instant messaging account may be generated according to various embodiments.

Figure 3:
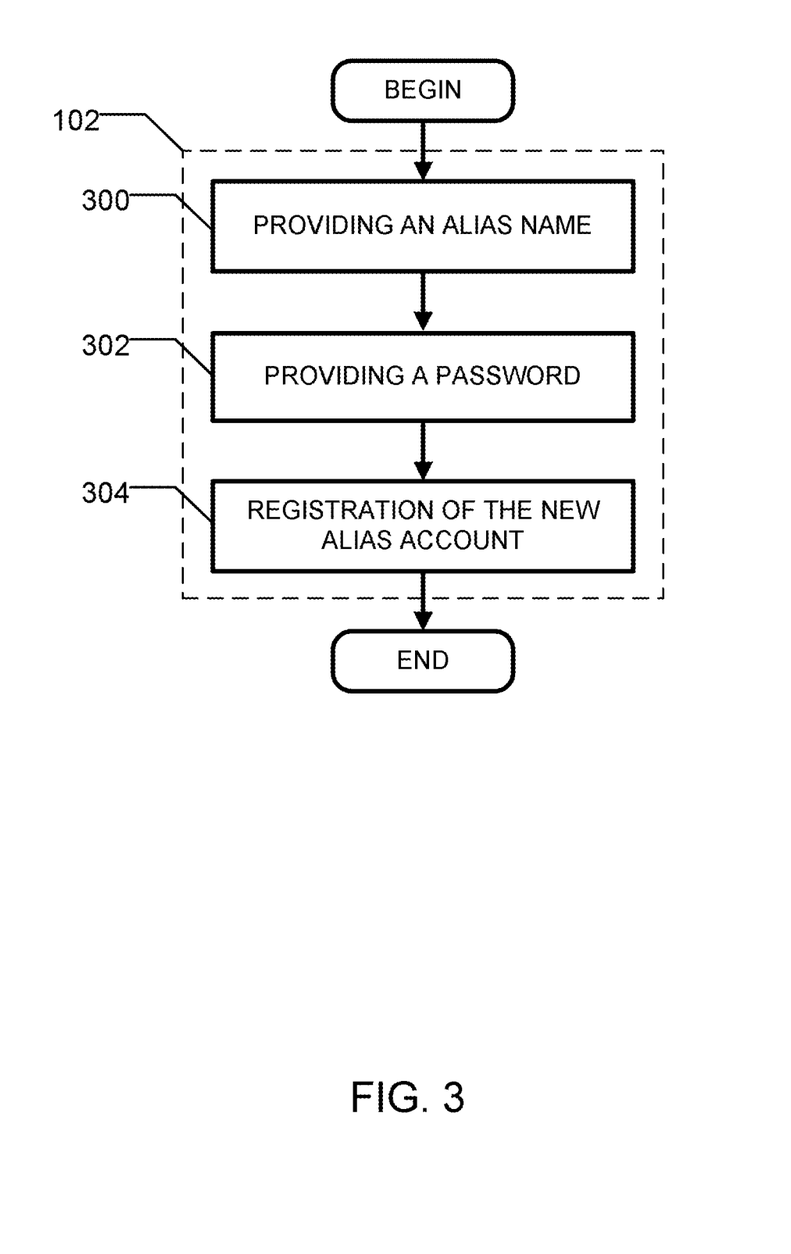
FIG. 3 is a flowchart which shows an embodiment for generating an additional instant messaging account.

Now referring to FIG. 3, there is shown an embodiment for generating an additional instant messaging account, also referred to as an alias account as mentioned previously.

According to processing step 300, an alias name is provided. The alias name is used for identifying a corresponding alias account. It will be further appreciated that the alias name may be provided according to various embodiments. In one embodiment, the alias name is provided by the user interacting with the mobile phone.

Still referring to FIG. 3 and according to processing step 302, a password is provided. It will be appreciated that the password may be of various types. In one embodiment, the password is defined by a preselected chain of characters. It will be appreciated that the password may be provided according to various embodiments. In one embodiment, the password is provided by the user interacting with the mobile phone.

While this has not been shown in FIG. 3, it will be appreciated that another copy of the password may be further requested from the user.

Still referring to FIG. 3 and according to processing step 304, a new alias account is registered. It will be appreciated that the new alias may be registered according to various embodiments.

Figure 4:
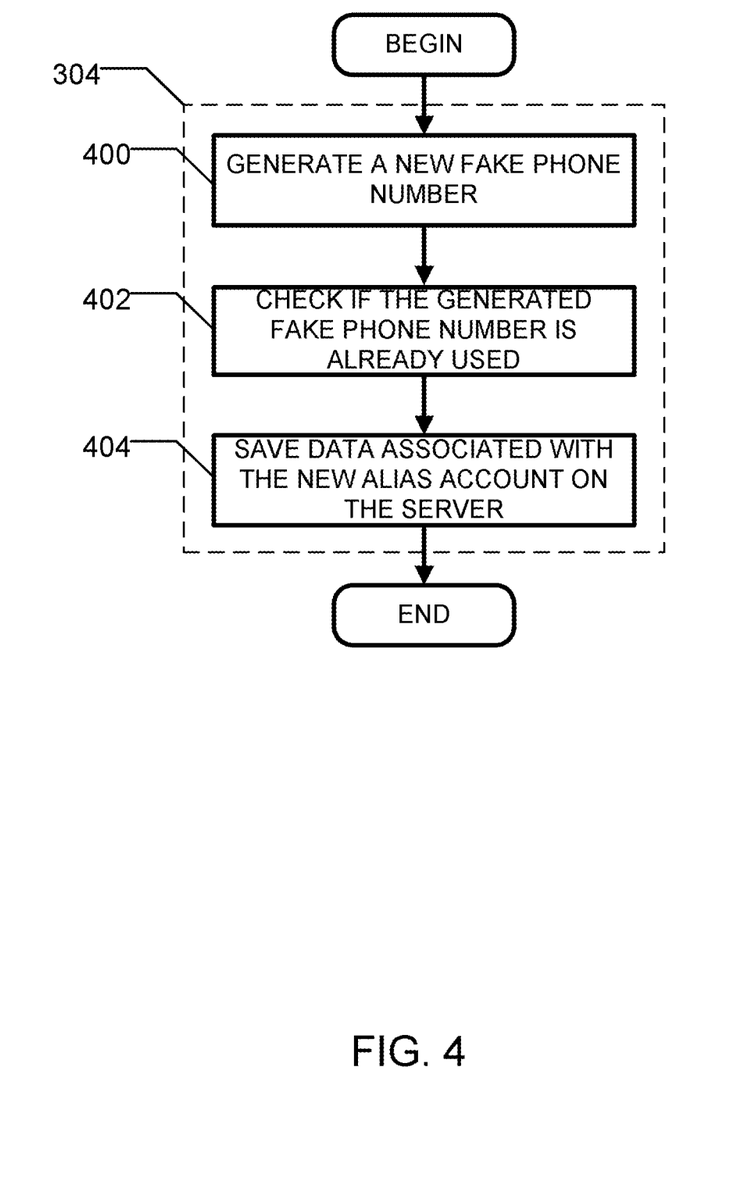
FIG. 4 is a flowchart which shows an embodiment for performing a registration of a new alias account.

Now referring to FIG. 4, there is shown an embodiment for performing the registration of the new alias account.

According to processing step 400, a new fake phone number is generated. It will be appreciated that the new fake number is a fake phone number which is uniquely associated with the new alias account to create. In fact, generating a fake phone number is of great advantage since it helps circumvent the great limitation that an instant messaging account is usually associated to a single mobile phone. By advantageously generating a fake phone number, more than one instant messaging account may be used with a single mobile phone. Each new alias account is independent in the sense that there is no link between two instant messaging accounts. As a matter of fact, the server of the application is not aware of a link between two instant messaging accounts. It will be appreciated that the fake phone number may be generated according to various embodiments.

In one embodiment, the fake phone number is generated by a server operatively connected with the instant messaging application running on the mobile phone. In an alternative embodiment, the fake phone number is generated by the instant messaging application running on the mobile phone. In such case, a check is performed at the server to find out if the fake phone number does not already exist.

Still referring to FIG. 4 and according to processing step 402, a check is performed to find out if the generated fake phone number is already used. It will be appreciated that this processing step is performed in the case where the fake phone number is generated on the mobile phone. It will be appreciated that the check is performed by the server operatively connected with the instant messaging application running on the mobile phone. In one embodiment, the checking comprises sending the generated fake phone number to the server and determining if the generated fake phone number is already located in a database of phone numbers used for the instant messaging application and located on the server. If the generated fake phone number already exists a new fake phone number is generated.

Still referring to FIG. 4 and according to processing step 404, data associated with the new alias account are saved on the server. The data comprises in one embodiment, the alias account name, the password and an alias ID. It will be appreciated that the alias ID is generated by the server upon creation of the new alias account using the fake phone number. In one embodiment, the alias ID is the last 7 digits of the fake phone number. It will be appreciated that that the alias ID is therefore a unique number which may be used by another given instant messaging account for communicating with the alias instant messaging account. While this has not been shown in FIG. 4, it will be appreciated that an optional picture may be provided and associated with the alias account and accordingly stored on the server. It will be appreciated that the alias account is a separate account so it may have any attributes of a real account such as a name, avatar, contact book, etc.

It will be appreciated by the skilled addressee that the data associated with the new alias account may be saved on the server according to various embodiments. In one embodiment, each alias account shares a contact book of the master account enabling a user to message all his contacts, using each alias account.

It will be appreciated that each alias account is a separate "identity" in the instant messaging application and has access to the full scope of features of the instant messaging application which is of great advantage. In fact, each alias account may be used to send and receive messages from other users or aliases. For example, an alias account can participate in group chats, join them and leave them. A user can even send messages to his own alias account from his master account and message his master account back from the alias account.

It will be appreciated that in one embodiment, the user can receive notifications and messages directed to his alias account 2 when using alias account 1. All chats from the user can be shown in one chat list, and the user is provided with some information of identity used in chat. The user may decide to open any chat and send message from used identity. It will also be appreciated that when the user has a master account and an alias account in same chat, he can select message author without leaving chat.

Figure 5:
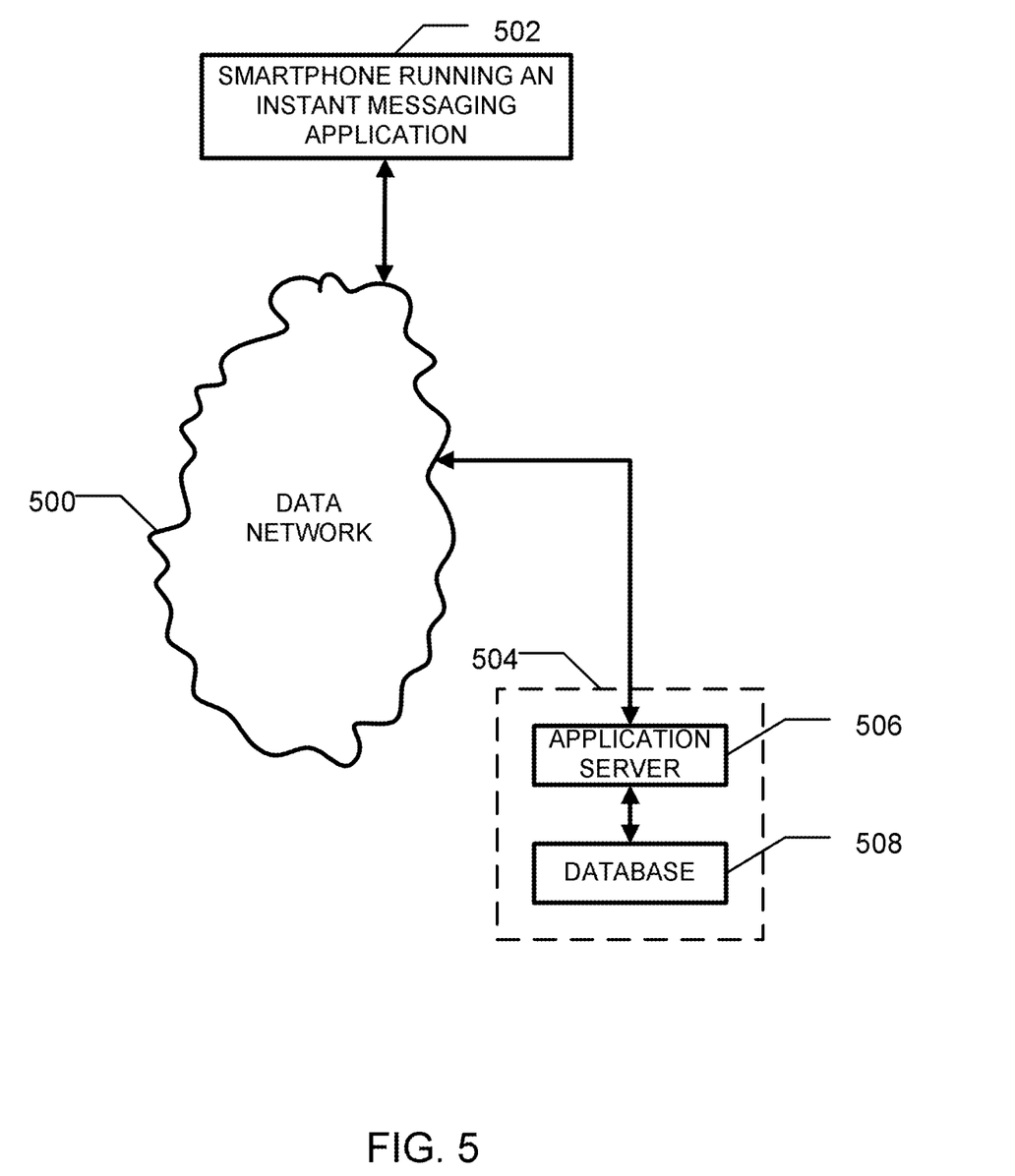
FIG. 5 is a diagram which shows an embodiment of a system in which the method for enabling a user to use a plurality of instant messaging accounts may be implemented into.

Now referring to FIG. 5, there is shown a diagram which shows a system in which the method for enabling a user to use a plurality of instant messaging accounts may be implemented.

The system comprises a data network 500, a mobile phone running an instant messaging application 502 and a server 504.

The mobile phone 502 typically includes a bus that directly or indirectly couples the following devices: memory, one or more processors, one or more presentation components, input/output (I/O) ports, input/output components, and a power supply. The bus may be one or more busses (such as an address bus, data bus, or combination thereof).

The mobile phone 502 typically includes a variety of computer-readable media. Computer-readable media can be any available media that can be accessed by the mobile phone and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology.

The memory may include computer-storage media in the form of volatile and/or nonvolatile memory. The memory may be removable, non-removable, or a combination thereof. Exemplary hardware devices include solid-state memory, hard drives, optical-disc drives, etc. The mobile device may include one or more processors that read data from various entities such as a memory or I/O components. In addition, presentation component(s), such as a display device or screen, present data indications to a user. I/O ports allow the mobile phone to be logically coupled to other devices including I/O components, some of which may be built in.

It will be appreciated that the mobile phone is an embodiment of a mobile device. Consequently the method disclosed herein may alternatively be implemented using for instance any one of a smartphone, a tablet, a laptop computer or such other internet or communication network-enabled electronic device.

The data network 500 may be of various types. In one embodiment, the data network 500 is selected from a group consisting of a local area network (LAN), a metropolitan area network (MAN) and a wide area network (WAN). In one embodiment, the data network 500 comprises the Internet.

It will be appreciated that the mobile phone 502 running an instant messaging application is operatively connected with the server 504 via the data network 500.

The server 504 comprises an application server 506 and a database 508 operatively connected with the application server 506. It will be appreciated that the application server 506 and the database 508 may be of various types.

It will be appreciated that the application server 506 is hosting the instant messaging application.

The database 508 may be used for storing data used by the instant messaging application hosted on the application server 506. In particular, the database 508 is used for storing data associated with each instant messaging account. The database 508 may also be used to store any other data used by the instant messaging application hosted on the application server 506.

Figure 6A:
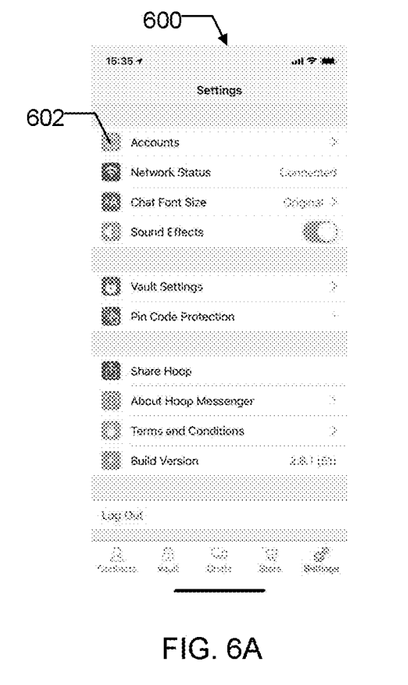
FIG. 6a is a screenshot which shows an embodiment of a graphics user interface of an instant messaging application.

Now referring to FIG. 6A, there is shown a screenshot which shows an embodiment of a graphic user interface of an instant messaging application. In this embodiment, the instant messaging application is Hoop Messenger™ manufactured by Magnificus Software Inc. As shown in this screenshot 600, a plurality of buttons are displayed. One of the plurality of buttons displayed is "Accounts" button 602. The "Accounts" button 602 is used for accessing a graphics user interface listing all instant messaging accounts available i.e. the master account as well as all alias accounts created, if any.

Figure 6B:
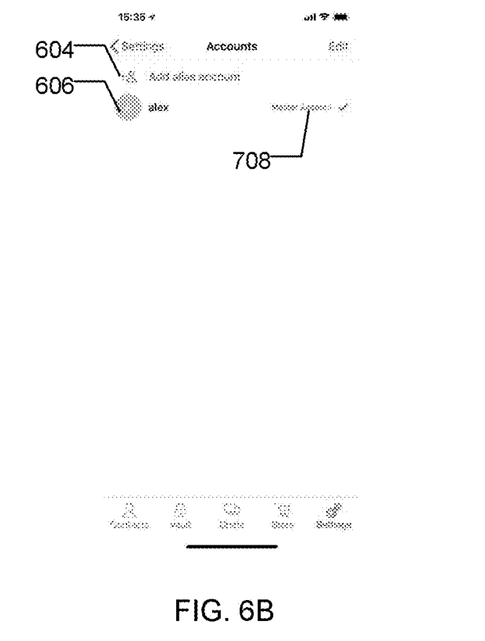
FIG. 6b is a screenshot which shows an embodiment of a graphics user interface of an instant messaging application showing a list of available instant messaging accounts.

Now referring to FIG. 6B, there is shown a screenshot which shows an embodiment of a graphic user interface of an instant messaging application. It will be appreciated that this graphics user interface is displayed if a user interacts with the "Accounts" button 602 displayed in FIG. 6A.

In this specific graphics user interface, an "Add alias account" button 604 is displayed. It will be appreciated that the "Add alias account" button 604 is used for starting a procedure for adding an alias account to the instant messaging master account. The graphics user interface shown in FIG. 6B further shows an existing master account 606. In this embodiment, the existing master account 606 is identified as "alex". It will be appreciated that an indication 708 is used to show that this instant messaging account is in fact the instant messaging master account. While an embodiment has been disclosed for showing the existing master account 606, the skilled addressee will appreciate that various alternative embodiments may be used.

Figure 6C:
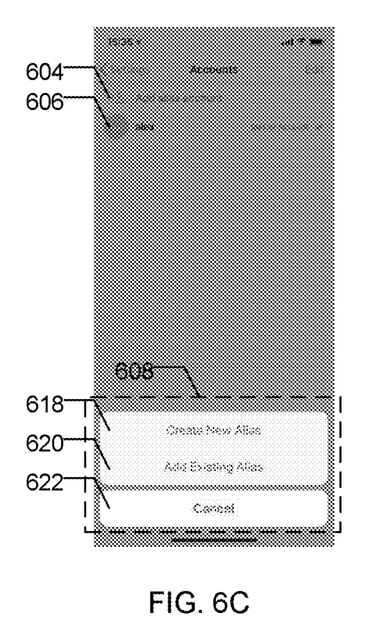
FIG. 6c is a screenshot which shows an embodiment of a graphics user interface of an instant messaging application showing a menu for adding an alias account.

Now referring to FIG. 6C, there is shown a screenshot which shows an embodiment of a graphic user interface of an instant messaging application. It will be appreciated that this graphics user interface is displayed if the user interact with the "Add alias account" button 604 shown in FIG. 6B.

In this specific graphics user interface, a menu 608 is displayed. The menu 608 provides three choices which may be selected using a corresponding button. More precisely, the menu 608 displays a "Create New Alias" button 618, an "Add Existing Alias" button 620 and a "Cancel" button 622. It will be appreciated that the "Create New Alias" button 618 is used is the user wishes to create from scratch and add the newly created alias account to the instant messaging application of the mobile phone of the user. The "Add Existing Alias" button 620 is used if the user wishes to add an existing alias account, i.e. already created, to the instant messaging application of the mobile phone of the user. The "Cancel" button 622 is used if the user wishes to cancel the display of the menu 608. The skilled addressee will appreciate that various embodiments may be provided for displaying the menu 608.

Figure 6D:
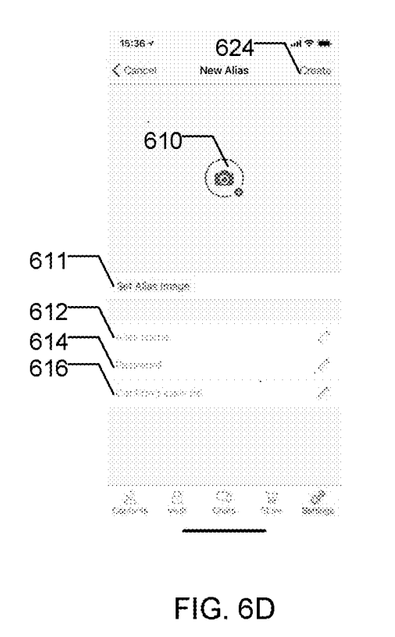
FIG. 6d is a screenshot which shows an embodiment of a graphics user interface of an instant messaging application showing a menu for adding a new alias account.

Now referring to FIG. 6D, there is shown an embodiment of a graphic user interface of an instant messaging application which is displayed if a user interacts with the "Create New Alias" button 618 of the menu 608 shown in FIG. 6C.

It will be appreciated that the purpose of this graphics user interface is to collect data used for creating the new alias account. The skilled addressee will appreciate that various embodiments may be provided for displaying this graphics user interface. In this specific embodiment, the graphics user interface comprises, inter alia, a "set alias image" button 610, a "set alias image" button 611, an "Alias Name" text box 612, a "Password" text box 614, a "Confirm password" text box 616 and a "Create" button 624.

Any of the "set alias image" button 610 and the "set alias image" button 611 may be used for providing an image which may be used as an alias image. In one embodiment, the image may be taken using the mobile phone if the mobile phone is provided with a camera integrated herein. In an alternative embodiment, the image may be taken from a library of images stored in the mobile phone of the user. In another alternative embodiment, the image may be taken from a library of emojis or stickers stored in the mobile phone. The skilled addressee will appreciate that various alternative embodiments may be possible for providing the alias image. It will be also appreciated that the providing of an alias image is optional.

The "Alias Name" text box 612 is used for enabling a user to enter an alias name for the alias account to create. In one embodiment, the alias name is a chain of characters selected by the user.

The "Password" text box 614 is used for enabling a user to enter a password for the alias account to create. In one embodiment, the password for the alias account is a chain of characters selected by the user.

The "Confirm password" text box 616 is used for enabling a user to enter another instance of the password selected for the alias account to create.

The "Create" button 624 is used for starting the generation of the alias account once a proper alias name and password have been successfully provided. It will be appreciated that the alias account may be created even if the alias image has not been provided in one embodiment. As a matter of fact, it will be appreciated that the alias image may be provided later on, after the creation of the alias account.

Figure 7A:
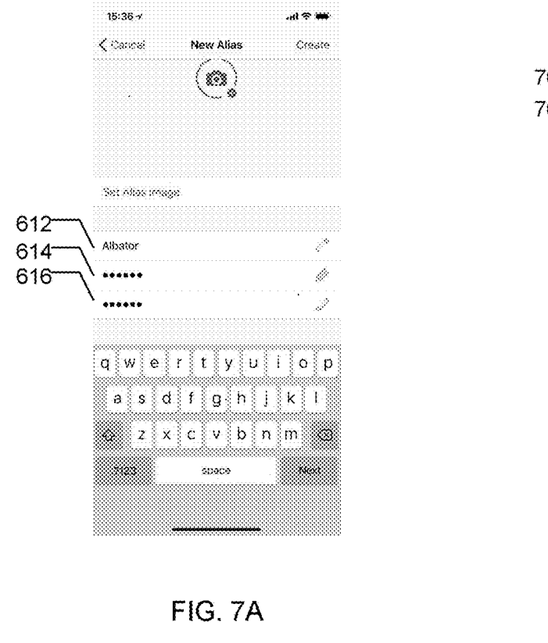
FIG. 7a is a screenshot which shows an embodiment of a graphics user interface of an instant messaging application showing a menu for adding a new alias account with corresponding information provided.

Now referring to FIG. 7A, there is shown a screenshot which shows an embodiment of a graphic user interface of an instant messaging application. It will be appreciated that this graphics user interface is displayed if the user interacts with the "Add Existing Alias" choice 620 of the menu 608 shown in FIG. 6C.

The skilled addressee will appreciate that various embodiments may be provided for this graphics user interface. In this specific embodiment, the graphics user interface comprises, inter alia, a "Alias ID" text box 700 and "Password" text box 702 and a "Add" button 704.

The "Alias ID" text box 700 is used for enabling a user to provide an identification of an existing alias account to add. As mentioned above, it will be appreciated that the identification is used to uniquely identify each alias account.

The "Password" text box 702 is used for enabling a user to provide a password corresponding to the alias account associated with the identification provided in the "Alias ID" text box 700.

The "Add" button 704 is used for adding the alias account to the instant messaging application running on the mobile phone of the user. It will be appreciated that that the "Add" button 704 may be actuated once the identification of an existing alias account to add and the corresponding password have been successfully provided by the user.

Figure 7B:
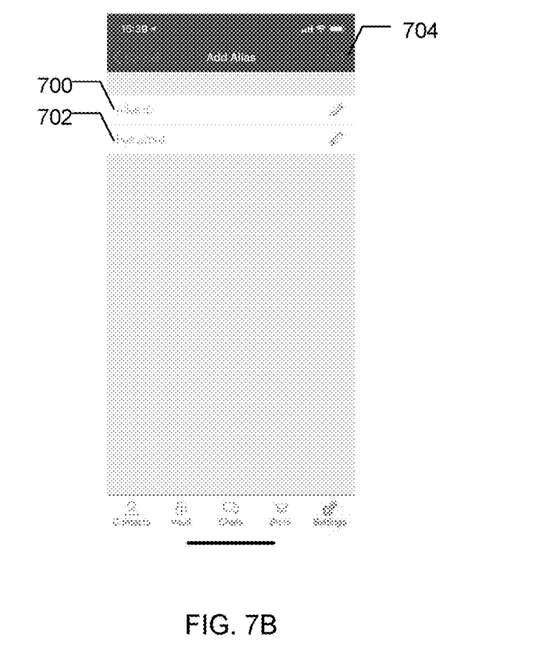
FIG. 7b is a screenshot which shows an embodiment of a graphics user interface of an instant messaging application showing a menu for adding an existing alias account.
Figure 7C:
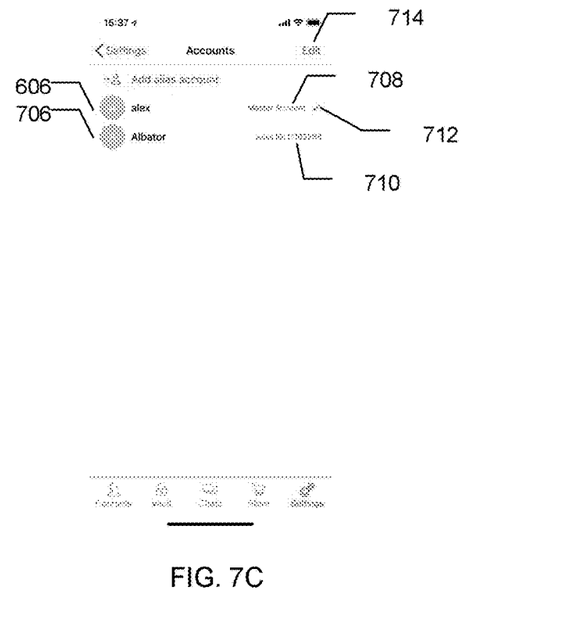
FIG. 7c is a screenshot which shows an embodiment of a graphics user interface of an instant messaging application showing a menu displaying a list of available instant messaging accounts.

Now referring to FIG. 7B, there is shown a screenshot which shows an embodiment of a graphic user interface of an instant messaging application. It will be appreciated that this graphics user interface is displayed if a user interacts with the icon "Accounts" 602 displayed in FIG. 6A following the creation of the alias account.

In fact, the skilled addressee will appreciate that this graphics user interface displays the existing master account 606 as well as a newly added alias account represented using "Albator" label 706. It will be appreciated that a corresponding label 710 is used for displaying the corresponding alias ID associated with the newly added alias account.

It will be further appreciated that a check mark 712 is used to indicate which instant messaging account is currently used by default in the instant messaging application. It will be appreciated that any of the master account and the at least one alias account may be selected to be used as a default account in the instant messaging application.

While it is indicated that a user may select a given instant messaging account to be used as a default account in the instant messaging application, it will be appreciated that the master account as well as all the alias accounts are logged in to the server simultaneously, so they are all capable of receiving messages and information updates instantly. The instant messaging application shows the appropriate interface according to the currently active alias.

It will be appreciated that there is also disclosed a computer-implemented method for enabling a user to use a plurality of instant messaging accounts in an instant messaging application. The computer-implemented method comprises accessing the master account of the instant messaging application upon successful authentication, the accessing of the master account comprising displaying of list of at least one previously generated additional instant messaging account and the master account. The computer-implemented method further comprises providing an access to any of the plurality of instant messaging accounts. It will be appreciated that the generating of the at least one additional instant messaging account comprises providing corresponding credentials for each given instant messaging account.

It will be also appreciated that there is also disclosed a non-transitory computer-readable storage medium for storing computer-executable instructions which, when executed, cause a mobile device to perform a method for enabling a user to use a plurality of instant messaging accounts in an instant messaging application, the method comprising accessing the master account of the instant messaging application upon successful authentication, the accessing of the master account comprising displaying of list of at least one previously generated additional instant messaging account and the master account and providing an access to any of the plurality of instant messaging accounts; wherein the generating of the at least one additional instant messaging account comprises providing corresponding credentials for each given instant messaging account.

As mentioned above, it will be appreciated that the mobile device may be any one of a smartphone, a mobile phone, a tablet, a laptop computer or such other internet or communication network-enabled electronic device.

It will be appreciated that the method disclosed herein is of great advantage for various reasons.

More precisely, an advantage of the method disclosed herein is that it enables a user to use a plurality of instant messaging accounts while logged in in a single instant messaging application.

Another advantage of the method disclosed herein is that it enables a user to create at least one additional instant messaging account without the need of having at least one additional dedicated mobile phone associated therewith.

Another advantage of the method disclosed herein is that each instant messaging account is handled independently from one another at the server. It is therefore impossible for a third party to distinguish between an alias account and a master account which is of great advantage.

Another advantage of the method disclosed herein is that the creation of an additional instant messaging account can be performed in a limited number of steps which is of great advantage for the user. As a matter of fact, the user does not even have to provide an existing phone number for the additional instant messaging account which is of great advantage.

Another advantage of the method disclosed herein is that the creation of an additional instant messaging account is performed when the user is logged using the master account which also reduces the complexity of the creation of the additional instant messaging account and the steps required for its creation.

Another advantage of the method disclosed herein is that the user may easily select an active instant messaging account in a given graphics user interface displayed in the instant message application which lists all available instant messaging accounts avoiding a logout and a subsequent login.

The embodiments described above are intended to be exemplary only. The scope of the invention is therefore intended to be limited solely by the appended claims.

The invention claimed is:

1. A computer-implemented method for enabling a user to use a plurality of instant messaging accounts in an instant messaging application, the computer-implemented method comprising:
in response to a successful authentication, accessing a master account for an instant messaging application;
in response to performing a given interaction, generating at least one additional instant messaging account within the instant messaging application, the generating comprising:
for each generated instant messaging account, uniquely associating a fake phone number with the generated instant messaging account, and
providing corresponding credentials for each generated instant messaging account;
in use, accessing the master account for the instant messaging application upon successful authentication; and
providing an access to each generated instant messaging accounts;
wherein the providing of the credentials for each generated instant messaging account comprises obtaining a password for each generated instant messaging account and generating a login for each generated instant messaging account; and
wherein the generating of the at least one additional instant messaging account further comprises obtaining at least an alias name for each generated instant messaging account.

2. The computer-implemented method as claimed in claim 1, wherein the successful authentication comprises providing a login, providing a password and determining that the login and the password provided are legitimate.

3. The computer-implemented method as claimed in claim 1, wherein each of the at least one associated fake phone number was generated as part of generating the login.

4. The computer-implemented method as claimed in claim 3, further wherein the generating of the login comprises, for each generated instant message account, selecting a given number of numbers of the associated fake phone number.

5. The computer-implemented method as claimed in claim 1, wherein the generating of the at least one additional instant messaging account further comprises obtaining an alias picture for each generated instant messaging account.

6. The computer-implemented method as claimed in claim 5, wherein the generating of the at least one additional instant messaging account comprises storing the corresponding generated credentials.

7. The computer-implemented method as claimed in claim 1, wherein the providing of an access to each generated instant messaging accounts comprises displaying a graphics user interface listing each generated instant messaging accounts.

8. The computer-implemented method as claimed in claim 1, wherein the providing of an access to each generated instant messaging accounts comprises selecting a given instant messaging account.

9. The computer-implemented method as claimed in claim 1, wherein the providing of the credentials for each generated instant messaging account comprises obtaining corresponding credentials from an already existing corresponding instant messaging account.

10. A computer-implemented method for enabling a user to use a plurality of instant messaging accounts in an instant messaging application, the computer-implemented method comprising:
accessing the master account of the instant messaging application upon successful authentication, the accessing of the master account comprising displaying a list of at least one previously generated additional instant messaging account and the master account; and
providing an access to any of the plurality of instant messaging accounts;
wherein a unique fake phone number is associated with the generated additional instant messaging account, and corresponding credentials are provided to each generated additional instant messaging account;
wherein the corresponding credentials provided to each generated additional instant messaging account comprises a password for each generated instant messaging account and a login for each generated instant messaging account and wherein at least an alias name is generated for each generated additional instant messaging account.

11. A non-transitory computer-readable storage medium for storing computer-executable instructions which, when executed, cause a mobile device to perform a method for enabling a user to use a plurality of instant messaging accounts in an instant messaging application, the method comprising:
- accessing the master account of the instant messaging application upon successful authentication, the accessing of the master account comprising displaying of list a at least one previously generated additional instant messaging account and the master account; and
- providing an access to any of the plurality of instant messaging accounts;
- wherein a unique fake phone number is associated with the generated additional instant messaging account, and corresponding credentials are provided to each generated additional instant messaging account;
- wherein the corresponding credentials provided to each generated additional instant messaging account comprises a password for each generated instant messaging account and a login for each generated instant messaging account; and
- wherein at least an alias name is generated for each generated additional instant messaging account.

* * * * *